Nov. 17, 1970  L. C. LYNNWORTH  3,540,265
DUAL ULTRASONIC SENSORS EMPLOYING DIFFERING MODES
OF ULTRASONIC TRANSMISSION
Filed May 21, 1968  4 Sheets-Sheet 1

INVENTOR
LAWRENCE C. LYNNWORTH
BY
Kenway, Jenney & Hildreth
ATTORNEYS

Nov. 17, 1970  L. C. LYNNWORTH  3,540,265
DUAL ULTRASONIC SENSORS EMPLOYING DIFFERING MODES
OF ULTRASONIC TRANSMISSION
Filed May 21, 1968  4 Sheets-Sheet 2
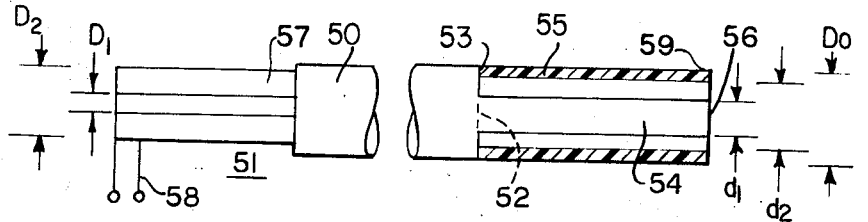
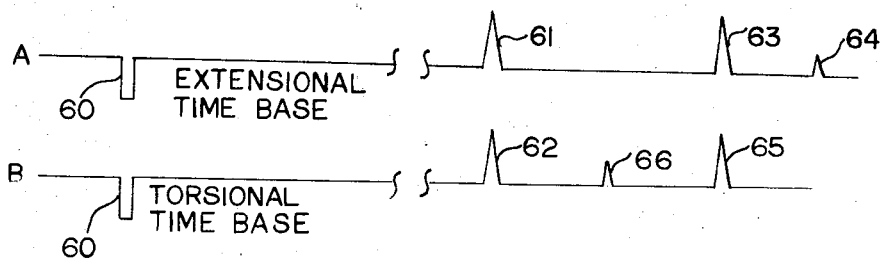
FIG. 5
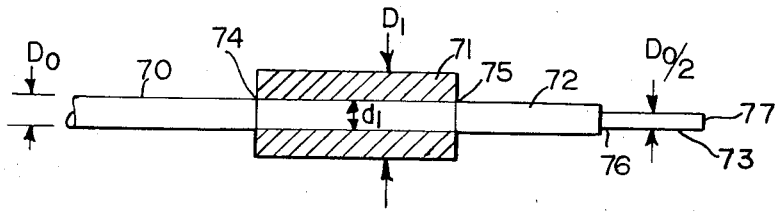
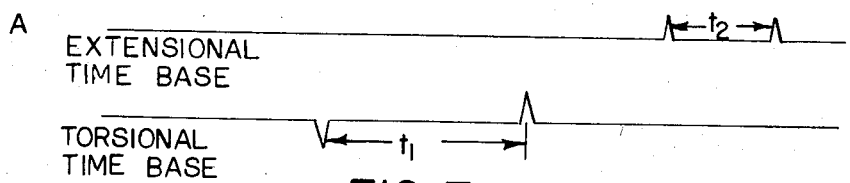
FIG. 7
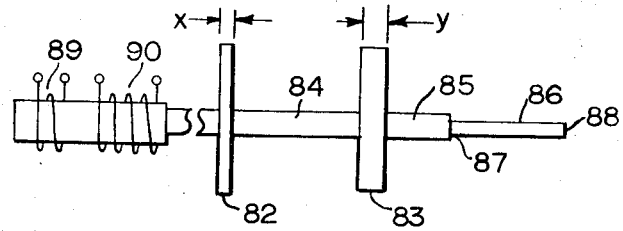
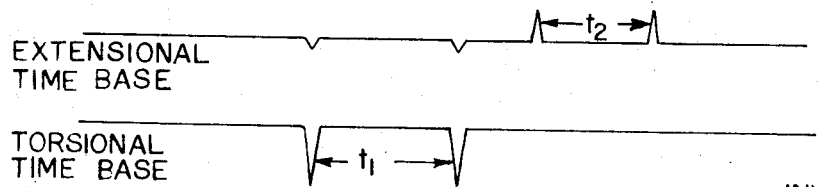
FIG. 8
INVENTOR
LAWRENCE C. LYNNWORTH
BY
*Kenway, Jenney & Hildreth*
ATTORNEYS

FIG. 6

| SECTION | AREA = $\frac{\pi D^2}{4}$ | POLAR MOMENT OF INERTIA J | NORMALIZED TORSIONAL WAVE IMPEDENCE |
|---|---|---|---|
| a) 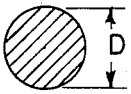 D | $\frac{\pi D^2}{4}$ | $\frac{\pi D^4}{32} = 0.098 D^4$ | 1.00 |
| b) 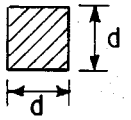 d × d | $d^2$ ($d \approx 0.9D$) | $\frac{d^4}{6} = 0.103 D^4$ | 1.05 |
| c)  2d × d/2 | $d^2$ | $\frac{17 d^4}{48} = .218 D^4$ | 2.23 |
| d) 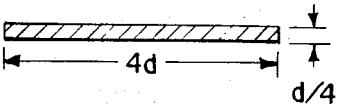 4d × d/4 | $d^2$ | $\frac{257 d^4}{192} = .825 D^4$ | 8.42 |
| e) 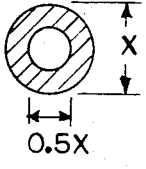 X, 0.5X | $\frac{3\pi X^2}{16}$ ($X = 2D/\sqrt{3} \approx 1.15 D$) | $\frac{15 \pi X^4}{512} \approx 0.164 D^4$ | 1.67 |
| f) 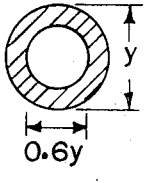 y, 0.6y | $0.16 \pi y^2$ ($y = 1.25 D$) | $0.0855 y^4 \approx 0.208 D^4$ | 2.12 |
| g) 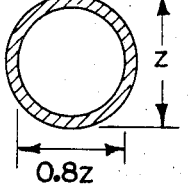 z, 0.8z | $0.09 \pi z^2$ ($z = 1.67 D$) | $0.0578 z^4 \approx 0.447 D^4$ | 4.55 |

INVENTOR
LAWRENCE C. LYNNWORTH

Nov. 17, 1970         L. C. LYNNWORTH         3,540,265
DUAL ULTRASONIC SENSORS EMPLOYING DIFFERING MODES
OF ULTRASONIC TRANSMISSION
Filed May 21, 1968                                           4 Sheets-Sheet 4

INVENTOR
LAWRENCE C. LYNNWORTH
BY
ATTORNEYS

United States Patent Office 3,540,265
Patented Nov. 17, 1970

3,540,265
DUAL ULTRASONIC SENSORS EMPLOYING DIFFERING MODES OF ULTRASONIC TRANSMISSION
Lawrence C. Lynnworth, Waltham, Mass., assignor to Panametrics, Inc., Waltham, Mass., a corporation of Massachusetts
Filed May 21, 1968, Ser. No. 730,872
Int. Cl. G01n 9/24
U.S. Cl. 73—67.7    14 Claims

ABSTRACT OF THE DISCLOSURE

An ultrasonic measuring system for determining ambient conditions on two sensing elements. The elements may be positioned either to respond to a distribution in space of one ambient condition or to respond to two different ambient conditions in the same area. An ultrasonic transducer produces waves in both the extensional and torsional modes which are coupled to two sensors by means of a single lead-in element. The composition and dimensions of the sensors and lead-in element are arranged so that reflection pulses at the ends of one sensor are selectively torsional mode and at the other are selectively extensional mode. By arranging the transducers and circuitry to compare the extensional mode pulses with one another, either on a time or amplitude basis and to compare the torsional mode pulses with one another, the ultrasonic transmission characteristics for each of the two sensors may be separately determined, thereby obtaining independent measurements of the ambient conditions at each of the sensors.

BACKGROUND OF THE INVENTION

This invention relates in general to ultrasonic measurement and more particularly to a system for measuring ultrasonic transmission characteristics within two juxtaposed or closely spaced sensing elements as indicative of ambient conditions at the two sensors.

The measurement of changes in ultrasonic transmission characteristic as indicative of the change in some ambient condition which affects this characteristic is well known in the art. There are a number of systems in which a specific sensing element is formed so that the transmission of an ultrasonic pulse from a suitable generator along the element results in a pair of reflection pulses and either the difference in time or difference in amplitude between these pulses serves as an indication of the temperature of the element. Such systems typically include an ultrasonic generator transducer which is actuated by specific pulsing circuitry, means for coupling the pulses from the generator to the element and a receiving transducer which produces output electrical pulses in response to received ultrasonic pulses. In many instances one tranducer serves both purposes. Some type of measuring circuit is employed to measure the time lapse between the first and second reflection pulses received from the sensing element or, alternatively, the circuitry is employed to measure the difference in amplitude between these two pulses. It is also known that other ambient conditions, such as neutron or gamma ray flux, can result in appropriate materials under going a change in their ultrasonic transmission characteristics. There are a number of situations, however, in which it is desirable to measure the ambient conditions at two different points in a medium and yet it is not practical to employ two different sets of measuring equipment. A similar problem arises where it is desirable to measure two ambient characteristics of the medium at substantially the same point, where both characteristics will affect ultrasonic transmission of sensing materials.

SUMMARY OF THE INVENTION

Broadly speaking, the ultrasonic measurement system of the present invention employs two sensing elements and an ultrasonic generator capable of generating pulses of ultrasonic energy in both the torsional and extensional modes. The generator may include a Weidemann transducer, which produces torsional mode pulses and a Joule transducer which produces extensional wave pulses or a combination Joule-Weidemann transducer which produces both. While these are magnetostrictive transducers, analogous piezoelectric generator choices are available. The generator of ultrasonic energy is coupled through a lead-in member to two sensing elements, thereby providing for transmission of the generated ultrasonic energy along these sensors. The acoustic impedances of each of the sensors and the lead-in member are selected so that impedance mismatches occur at the beginning and the end of each of the sensors. Under these conditions, a pulse of ultrasonic energy transmitted along the lead-in member will result in reflection pulses from each end of each of the sensors.

Since the acoustic impedance for torsional mode pulses depends upon dimensions in a different way from that of extensional mode pulses, these elements may be arranged such that there is preferential reflection of torsional mode energy from one sensor and extensional mode energy from the other. There are a number of ways in which this association of a particular mode with a specific sensor may serve as a basis for separate measurements of the ultrasonic transmission characteristics of the two sensors. One way in which this may be accomplished is to include two separate receiving transducers in a system, one receiving transducer being sensitive only to reflected pulses in the torsional mode and the other sensitive only to reflected pulses in the extensional mode. The outputs from these two transducers are then fed to separate circuits for independent measurement of the time or amplitude variations.

A second method is to distinguish between the modes on a time basis. In those instances where the sensing elements are serially interconnected, that is, where the lead-in member is coupled to one sensing element and that sensing element is in turn coupled to the second sensing element, the acoustic impedances can be controlled such that the reflection pulses generated at the intersection between the lead-in member and the first sensing element in response to extensional mode are many times the amplitude of reflection pulses at that intersection from ultrasonic waves in the torsional mode. If the relative impedances between the first and second sensors are arranged so that the energy transmitted through this intersection and along the second sensor is primarily in the form of a torsional mode wave, then the transit time of this wave, as indicated by the reflected pulse from the end of the second sensing element, is primarily indicative of torsional wave transmission in this second sensor. Thus, the time gap between the first two pulses received by the receiving transducer is indicative of the transmission of extensional mode ultrasonic waves along the first sensing element and the time space between the second and third pulses is indicative of the transmission of torsional mode ultrasonic waves along the second sensing element.

Still another method of separating the transmission characteristics between the two sensing elements is to employ a Joule-Weidemann ultrasonic pulse generating transducer which will produce ultrasonic waves in both modes in response to electrical excitation. The frequency bandwidth of the generated ultrasonic pulse is approximately 1/T, where T, the ultrasonic pulse width can be made approximately equal to the time required for sound to pass the length of the coil. If the coil is properly proportioned with respect to the duration of the exciting pulses, then the torsional mode pulse will have a different, i.e., lower and smaller bandwidth spectrum than the extensional mode pulse. Therefore, the reflected torsional mode pulses received by the transducer will produce electrical signals having a different frequency characteristic than will be reflected extensional mode pulses received by the transducer. Circuitry can be arranged to distinguish these pulses on the basis of their frequency characteristics.

DESCRIPTION OF THE DRAWING

In the drawing:

FIG. 5 is an illustration in cross sectional view of a probe assembly formed in accordance with the principles of this invention;

FIG. 6 is a cross sectional view of a variety of sensor configurations, together with their mechanical wave impedance characteristics;

FIG. 7 is an illustration in cross sectional view of another embodiment of a probe assembly constructed in accordance with the principles of this invention; and FIGS. 8 and 9 are illustrations in plane view of other embodiments of this invention.

DESCRIPTION OF PREFERRED EMBODIMENTS

Figure 1:
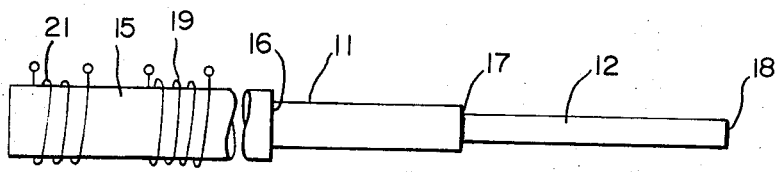
FIG. 1 is an illustration in diagrammatic form of a sensor probe formed in accordance with the principles of this invention.

In FIG. 1 there is illustrated a probe assembly including two sensors 11 and 12 and a lead-in member 15. The interface between the lead-in member and sensor 11 is designated 16, while the interface between sensor 11 and sensor 12 is designated 17. A transducer coil 19 is shown wrapped around a magnetostrictive portion of the lead-in member 15. This probe assembly may be used to measure the ambient temperature at two consecutive positions in space occupied by the sensor 11 and the sensor 12. This determination is made by interrogating the sensors with ultrasonic waves to determine the ultrasonic transmission characteristic of the sensor, which characteristic is related to the ambient temperature. In order to separate the characteristics of the two sensors, one sensor is interrogated primarily with torsional waves and the other with extensional waves. This is accomplished by controlling the acoustic impedances at the interfaces 16 and at the interface 17 so that torsional waves are preferentially reflected at the boundaries of the first sensor and extensional waves at the boundaries of the other. This difference in discontinuities can be arranged because torsional waves and extensional waves depend upon the cross sectional dimensions differently. For example, in a round wire the extensional wave impedance depends upon the second power of the radius while the torsional wave impedance depends upon the fourth power of the radius. Thus, if the probe assembly illustrated in FIG. 1 included a lead-in member and first and second sensors all formed of the same material in cylindrical form and, if the lead-in member had a diameter of 1 millimeter, the first sensor a diameter of .75 millimeters and the second sensor a diameter of .5 millimeters, then the impedance ratio for torsional and extensional waves at interface 16 would be:

torsional impedance ratio $= (1/.75)^4 = 3.16$,
extensional wave impedance ratio $= (1/.75)^2 = 1.78$ For the above dimensions, the sensor 11 would be considered primarily a torsional wave sensor, while the sensor 12 would be considered primarily an extensional wave sensor.

The transmission characteristics are determined by measuring, in one example, the transmission velocity of the torsional waves along one sensor and the extensional waves along the other. This velocity is obtained by measuring the time separation between the pulse reflected from the interface at the first end of the sensor and the pulse reflected at the terminal end of the same sensor, the sensors being of known length. Since the terminal end of the second sensor 12 is not joined to another element, then the acoustic impedance mismatch is determined by the relative impedance of the sensor element 12 and the surrounding medium, whether it be vacuum, air or other fluid.

One method of distinguishing between the pulses generated from the torsional sensor and those reflected from the extensional sensor is to utilize two different and separate receiving transducers. The generators of the ultrasonic pulse may either be magnetostrictive generators with exciting coils or piezoelectric elements. In the former case, either the lead-in element or a separate unit coupled to the lead-in element is formed of a magnetostrictive material and an exciting coil, such as that shown as 19, is wrapped around the magnetostrictive material to generate the ultrasonic pulses. In most instances, the generator also serves as the receiving transducer with electrical pulses being produced in the coil in response to the reflected ultrasonic energy. It is well known in the art to operate such ultrasonic generators to produce by the Weidemann effect torsional waves or by the Joule effect extensional waves from a single excitation. These effects may also be combined in a Joule-Weidemann transducer to produce both modes. By operating separate coils, both may be excited simultaneously, however, each coil will respond as a receiving transducer only to the appropriate mode. Thus, the output electrical signals generated from one coil may be used to produce the electrical pulses for measurement from one sensor and electrical pulses from the other coil may be used as indicative of the transmission characteristics of the other sensor. The coil 21 shown in dotted lines in FIG. 1, represents this two coil transducer. Of course, piezoelectric crystals properly polarized may be employed as separate torsional and extensional transducers or as a combined torsional and extensional transducer. The receiving transducer for producing electrical output signals may be the same element as the ultrasonic generator or may be separate.

Figure 2:
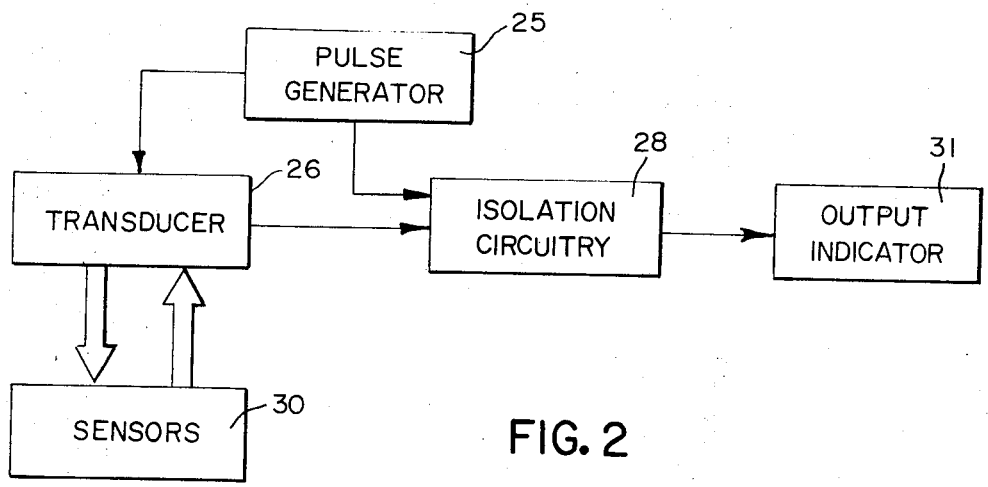
FIG. 2 is an illustration in block diagrammatic form of a measurement system in accordance with the principles of this invention.

In FIG. 2, there is illustrated a general block diagram of a circuitry arrangement suitable for use with the sensor probes in the practice of the invention. The pulse generator 25 produces electrical pulses of a suitable pulse width to generate the appropriate frequency ultrasonic waves and these pulses are applied both to the transducer, indicated generally at 26 and to isolation circuitry 28. The transducer 26 produces, in response to the exciting pulse, ultrasonic waves of both torsional and extensional mode and applies them to the sensors 30. In addition, the reflected acoustic energy from the sensors 30 is transformed at transducer 26 into electrical signals which are also applied to the isolation circuitry 28. The isolation circuitry 28 both isolates the pulses indicative of one of the sensors from that of the other and provides to the output indicator 31 a signal indicative of the time duration between the pairs of pulses associated with each sensor. In some instances, the attenuation characteristic may be measured instead of the velocity and, in those instances, isolation circuitry 28 may be arranged to provide an output indication of the ratio of the amplitude between the signals from the initial and terminal end of the appropriate sensor.

The exact form of the isolation circuitry 28 will depend upon the basis for separation of the torsional reflection pulses from the extensional reflection. With the probe assembly illustrated in FIG. 1a, the circuitry need only provide for independent paths for signals from the terminals of transducers 19 and 20 with a flip-flop, ramp generator or other conventional circuit for producing an output pulse related to the separation time between the two input pulses on a channel. Another basis of separation is that of amplitude where the torsional reflection coefficient and extensional reflection coefficients are made sufficiently different so that the large amplitude pulses may be characterized as from one sensor, while the small amplitude pulses are generated in the other sensor. In this instance, a single receiving transducer may be used and the isolation circuitry 28 would include amplitude discrimination means as a basis for separating out the pulse pair from each sensor. The position in time of the pulses may also serve as a basis for separation, both in the case where the two sensors are coupled in parallel to the lead-in member, as shown in FIG. 5, or in the case where the two sensors are serially connected as in FIGS. 3 and 4. In the case where the sensors are serially connected, the time lapse between one pair of reflections is indicative of the transmission of the appropriate mode pulse along the first sensor and the time lapse between another pair of pulses is indicative of the transmission velocity of the other mode pulse along the second sensor. The relative spacing of these pairs depends on the physical spacing of transducers and sensors, and on the velocities along the entire line for the two modes. In the instance where the sensors are connected in parallel, the torsional mode pulses will be later occurring due to the slower transmission velocity, $V_T$, of torsional waves, $(V_0/V_T = \sqrt{2(\sigma+1)} \approx 1.4(1+\sigma/2))$, where $\sigma$=Poisson's ratio, $\sigma$ typically being ⅓ to ¼), assuming equal path lengths and identical materials for both sensors.

The two sensors are characterized as torsional or extensional wave sensors as a result of the difference of impedance ratios for the two modes at the terminal points of the sensors. This difference in impedance ratios can result from a change in shape of the element transmitting the acoustic energy or a change in the composition of the material of the elements or both. The basis of the difference in ratios attributable to a change in shape arises from the consideration that the reflection coefficient for extensional waves is $$R_{(ext)} = \frac{(\rho V_o A)_2 - (\rho V_o A)_1}{(\rho V_o A)_2 + (\rho V_o A)_1}$$

where $\rho$=density
$V_0 = \sqrt{E/\rho}$=extensional wave velocity
E=Young's modulus
A=cross sectional area whereas the reflection coefficient for torsional waves is $$R_{(tors)} = \frac{(\rho V_T J)_2 - (\rho V_T J)_1}{(\rho V_T J)_2 + (\rho V_T J)_1}$$

where $V_T = \sqrt{G/\rho}$=torsional wave velocity
G=shear modulus
J=polar moment of inertia Since the cross sectional area is proportional, in the case of a solid round cylindrical wire, to the diameter squared while the polar moment of inertia is proportional to the diameter to the fourth power then these reflection coefficients can be significantly different at the same physical discontinuity. Below it is pointed out that this same physical discontinuity can also present two different impedances to the two modes, when these modes have different pulse widths.

In FIG. 6, there are illustrated a variety of cross sectional configurations with a constant area and differing polar moments of inertia. Thus, it can be seen that the materials and configurations of the lead-in member, the first sensor and the second sensor may be arranged so that the reflection coefficient for torsional waves at the intersection between the lead-in member and the first sensor may be made very high, while maintaining a relatively low coefficient at the same intersection for extensional waves. The reflection coefficient at the intersection between the first and second sensors can then be made high for extensional waves thereby generating a significant extensional wave reflection pulse at this second intersection.

Generally, for waves containing the same frequency spectrum, the torsional wave will be attenuated more highly than the extensional wave and thus it is usual to reflect the torsional waves from the first sensor and the extensional waves from the second, where the sensors are arranged serially as in FIG. 1. In some instances, however, it may be desirable for the second sensor to be a torsional wave sensor and the first sensor an extensional wave sensor. Since the torsional wave, for a given pulse width has a shorter wave length by about a factor of 1.5, the torsional waves will serve better to localize a temperature within a small region and also are more suitable for following a non-straight line path.

Figure 3:
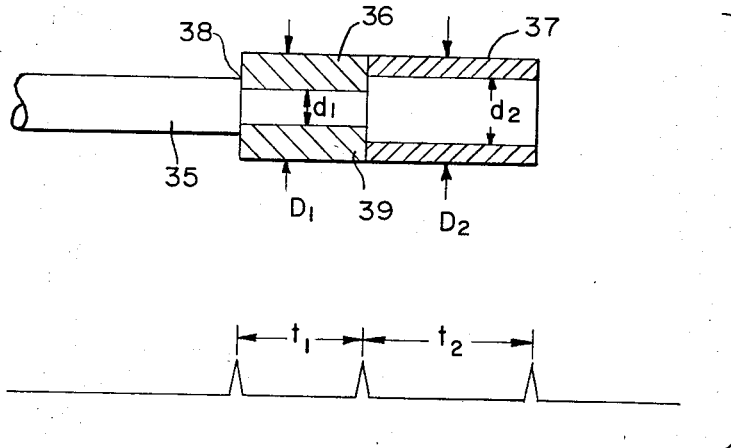
FIG. 3 is a cross sectional view of one embodiment of a sensor probe assembly constructed in accordance with the principles of this invention.

The probe assembly shown in FIG. 3 uses one material for the lead-in element 35, the first sensor 36 and the second sensor 37. The interface 38 between the lead-in element 35 and the first sensor 36 is to exhibit a substantial reflection coefficient for extensional waves and a minimal one for torsional waves, but both modes are to be reflected at the interface 39 between sensor 36 and sensor 37. The lead-in member 35 is a solid circular cylinder, while the sensors 36 and 37 are tubes. If the polar moment of inertia of the lead-in member 35 equals that of the first sensor 36, there will be no torsional wave reflections at interface 38. This condition can be expressed as $$J_{(35)} = \frac{\pi D_0^4}{32} = \frac{\pi}{32}(D_1^4 - d_1^4) = J_{(36)}$$

If the inner diameter, $d_1$, of the first sensor is made equal to the diameter, $D_0$, of the lead-in member, both diameters being set at one millimeter, then $$\frac{\pi D_0^4}{32} = \frac{\pi}{32}(D_1^4 - D_0^4)$$

and $D_1^4 = 2D_0^4 = 2$ and $D_1 = 1.19$ mm.

The impedance ratio for extensional waves at interface 38 is then the ratio of the cross sectional area of the circular cylinder 35 to that of the tube 36, which ratio equals 2.42. If the cross sectional areas of the sensor 37 and the sensor 36 are established as the ratio 2.5 and the outer diameter, $D_1$ and $D_2$, of the two sensors are kept equal, then the inner diameter, $d_2$, of the second sensor 37 will equal 1.12 millimeters. Under these circumstances, approximately equal extensional wave reflections (neglecting attenuation) will be generated at both interface 38 and interface 39.

With these dimensions, the torsional wave impedance ratio at the interface 39 is $$\frac{J_{(36)}}{J_{(37)}} = \frac{D_1^4 - d_1^4}{D_2^4 - d_2^4} = 2.28$$

The wave forms shown in FIG. 3 indicate the pulses relative to the interface which generates them, however, it should be understood that the time separations between the pulses indicated by $t_1$ and $t_2$ are not directly in proportion to the relative length, since the torsional wave will travel more slowly than the extensional wave. Similarly, the amplitudes of the pulses may also differ. However, a measurement of the time $t_1$ will be indicative of the velocity of extensional waves along the sensor 36, while the measurement of the time $t_2$ will be indicative of the velocity of torsional waves along the sensor 37.

Figure 4:
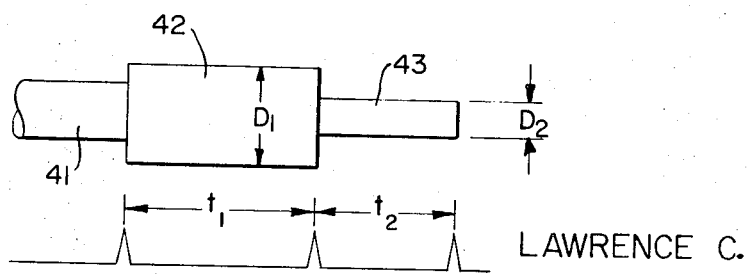
FIG. 4 is an illustration in plan view of a second embodiment of a sensor probe assembly formed in accordance with the principles of the invention.

The probe assembly of FIG. 4 illustrates an embodiment in which the shape factor is maintained as a solid circular cylinder, while the two sensors are formed of different materials. The first sensor 42 is formed of zinc, while the lead-in member 41 and the second sensor 43 are formed of tungsten. The characteristic impedances for extensional and torsional waves in these two materials, as given by the American Institute of Physics Handbook, are as follows:

| Material | Extensional wave, g./cm.²-μs. | Torsional wave g./cm.²-μs. |
|---|---|---|
| Zinc | 2.73 | 1.73 |
| Tungsten | 8.64 | 5.05 |

Again, in order for the second sensor 43 to be the torsional wave sensor, the torsional impedances between the lead-in member 41 and the first sensor 42 must be equal which implies that the polar moments of inertia must bear the same ratio as the characteristic impedances of the two materials. Therefore, if $D_0$, the diameter of the lead-in member, equals one millimeter, then $D_1$ must equal $(2.94)^{1/4}$, which equals 1.31 millimeters. If the diameter, $D_2$, of the sensor 43 is set at one half the diameter $D_1$ of sensor 42, then the ratio between the polar moment of inertia of sensor 42 and that of sensor 43 equals 16.0 and the torsional impedance ratio between these sensors equals 5.5.

The extensional wave impedance ratio between the lead-in member 41 and the first sensor 42 equals 1.84 and the extensional wave impedance ratio between sensor 42 and sensor 43 equals 1.28. Thus, in this configuration also the second sensor 43 serves as a torsional sensor.

In the embodiments previously described, the sensors have been axially positioned, thereby measuring an ambient condition, such as temperature, at two axially displaced positions. There are a number of situations in which it is desirable to distribute the sensors radially, either to measure the radial distribution of an ambient condition or, perhaps, to measure two different ambient conditions, at the same axial position. For example, it may be required to measure both nuclear flux and temperature in a region known to be isothermal. One method of accomplishing this is to select the sensor materials such that one material responds primarily to one condition, while the other material is sensitive to the other condition. Thus, copper is sensitive to nuclear flux and temperature, while aluminum is relatively insensitive to nuclear flux but is sensitive to temperature. The probe assembly of FIG. 5 includes an aluminum sensor 54 attached to the end of an aluminum lead-in 50 with a tubular copper sensor 55 coaxially mounted with respect to the sensor 54 and joined to the lead-in 50 at interface 53. The interface 52 between the aluminum sensor 54 and the lead-in 50 is formed by the change of shape and dimension of the aluminum. A magnetostrictive transducer 51 which includes both the magnetostrictive line 57 and the coil 58 is capable of producing both torsional and extensional waves. In order to obtain the preferred operation, it is desirable that the magnetostrictive portion, 57 of the transducer 51 be matched to the lead-in 50 for both torsional and extensional modes. It is also desirable that one of the sensor 54 and 55 receives primarily extensional mode ultrasonic waves, while the other receives primarily torsional waves. Thus the relative acoustic impedances for the two different modes at the interfaces 52 and 53 should be arranged to substantially exclude one mode from each sensor while providing significant reflection pulses for measurement of the other mode in the same sensor.

If it is assumed that the diameter $D_0$ of the lead-in 50 is one millimeter, then to obtain extensional wave echoes of substantially equal magnitude at the interface 52 and at the terminal point 56 of the aluminum sensor 54, the diameter $d_1$ of this sensor should be about half that of the lead-in 50. If this diameter $d_1$, is established as .5 millimeters, the extensional wave impedance of the sensor 54 is ¼ that of the lead-in, while the torsional wave impedance of sensor 54 is $\frac{1}{16}$ that of the lead-in 50. Under these circumstances, the torsional wave pulse generated at the end 56 of the aluminum sensor 54 will be very small.

Two waveform diagrams are shown in FIG. 5. The two waveforms have different time bases, the waveform A having a time base approximately one half that of waveform B, the pulses shown on the waveform A being those arising from extensional wave reflections. The pulse shown on waveform B are those arising from torsional wave reflections. The waveforms have been shown in this manner in order to make clear the points of the sensor assembly from which the reflection pulses arise. The torsional wave end echo 66 arises, as above indicated, from thee nd of the aluminum sensor 54 and is seen to be very small in amplitude. The pulses 61 and 63 representing extensional reflections from the interface 52 and from the terminal point 56 of the aluminum sensor 54 serve as the basis of measurement of the ultrasonic transmission characteristics of the aluminum sensor 54. Measurements may be made over a range of frequencies to enhance the determination of ambient conditions which manifest themselves as attenuation effects.

The interior diameter $d_2$ of the copper sensor 55 is arrived at by setting its torsional wave impedance equal to ¼ that of the aluminum lead-in for producing torsional wave echoes of substantially equal amplitude form both interface 53 and the terminal point 59 of this copper sensor 55. This impedance is calculated on the basis of the formula $$(\rho V_T J)_{copper} = \frac{1}{4}(\rho V_T J)_{aluminum}$$

from which, $d_2 = 0.973$ mm.

Under these circumstances, the copper sensor 55 has an extensional wave impedance about 11% that of the aluminum lead-in 50 and therefore the extensional wave end echo 64 from the copper sensor 55 is also very small in amplitude. Reflection pulses 62 and 65 on the torsional time base B are the torsional reflection pulses from the interface 63 plus a small contribution from interface 52 and the end point 57 on the copper sensor 55, and the time between these pulses serves as a measure of the transmission characteristic of the copper sensor 55. The amplitudes of the pulses shown in the wave forms of FIG. 5 are not scaled except to show the relatively small amplitude of the pulses 64 and 66.

One of the features of the assembly shown in FIG. 5 is the matching of the transducer 57 impedance to the lead-in member 50 impedance for both modes. If the material of the magnetostrictive portion 57 of transducer 51 is nickel, then to match both mode impedances, it is required that $$(\rho V_o A)_{nickel} = (\rho V_o A)_{aluminum}$$

and $$(\rho V_T J)_{nickel} = (\rho V_T J)_{aluminum}$$

The extensional wave velocities, $V_0$, in aluminum and nickel are essentially equal with a value of 0.5 centimeter per microsecond and the torsional wave velocities, $V_T$, in aluminum and nickel are also approximately equal and have the value 0.3 centimeter per microsecond. Therefore, these equations reduce to $$\rho(A/J)_{nickel} = \rho(A/J)_{aluminum}$$

For a solid round wire, $$A/J = 8/(\text{diameter})^2$$

which for a diameter of 1 millimeter means that $$A = \frac{\pi}{4} \text{ and } J = \frac{\pi}{32}$$

The density, $\rho$, of nickel is three times that of aluminum, hence $$A_{nickel} = \frac{\pi}{12} \text{ and } J_{nickel} = \frac{\pi}{96}$$

The diameters $D_1$ and $D_2$ must now be selected so that the area and polar moment of inertia of the nickel portion 57 meets these requirements. Values of $D_1=0.577$ millimeter and $D_2=0.817$ millimeter provide an impedance match for both extensional and torsional waves. The particular placement of the coil at the end of the member 57 facilitates minimizing the number of specimen echoes in the line.

In the embodiments described above, each of the sensors has at least one common interface, that is, in the serially arranged assemblies, the sensors were adjacent so that the interface at the end of one sensor corresponded with the interface at the beginning of the other sensor. As illustrated in FIGS. 7 and 8, it is also possible to arrange the sensor assemblies with the first and second sensor separated by an intermediate buffer.

In FIG. 7, the lead-in element 70 has a diameter $D_0$ and is extensionally matched to the first sensor 71 at interfaces 74 and 75. The torsional impedances at interfaces 74 and 75 differ from that of the lead-in so that reflections for torsional waves are created at these interfaces. If the lead-in 70, the first sensor 71, the buffer 72 and the second sensor 73 are all made of one type of material, and if $D_0$ equals one millimeter and if $d_1 = D_0$, then $\sqrt{D_1^2 - 1} = 1$, or $D_1 = \sqrt{2} = 1.414$ millimeters.

This value results in a ratio of polar moments of inertia between the lead-in element 70 and the first sensor 71 of $D_1^4 - 1 = 3$.

If the diameter of the extensional sensor 73 is selected to be $D_0/2$, then the extensional wave impedance of sensor 73 is four times that of the buffer element 72. Therefore, extensional wave reflection pulses are generated at interface 76 and terminal point 77.

In the embodiment of FIG. 8, the torsional sensor 84 includes a pair of disk elements 82 and 83 fastened to it to generate the torsional mode reflections. The torsional impedance of the disks 82 and 83 is determined by the thicknesses X and Y respectively along the axis of propagation of the wave. If the thicknesses X and Y are made less than to the wave length of the torsional mode waves, substantial reflections still result. If these thicknesses are made short compared to the wave length of the extensional mode waves, there is no substantial reflection coefficient in that mode from these disks. The selective reflection operation of the torsional sensor illustrated in FIG. 8 is enhanced by using a longer coil for the extensional transducer 90 than for the torsional transducer 89, and by driving the extensional transducer 90 with a longer duration electrical pulse. Even where the duration of the driving pulses are the same, the length in space of the extensional mode pulse is about 50% greater than that of the torsional pulse because of the difference in extensional velocity and torsional velocity. By further emphasizing this effect with a difference in pulse length duration of the driving pulse, the reflection effects of the disks on the extensional pulse are further minimized.

Figure 9:
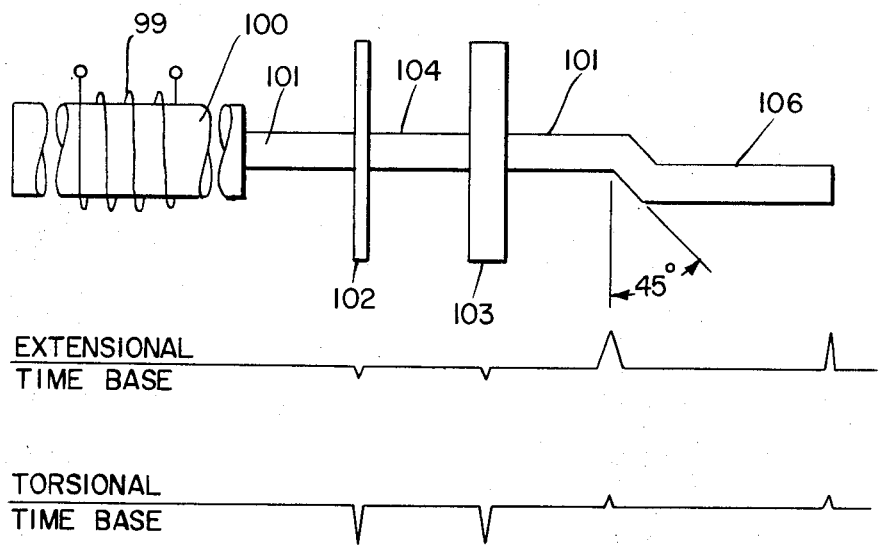

In FIG. 9, there is illustrated a probe assembly which includes a lead-in element 100 coupled to a round cylindrical element 101, which has mounted on it a pair of disks 102 and 103. The element 101 has a second section 106 connected to it through a 45° angle. This assembly forms two sensors, the first sensor comprising the disks 102 and 103 and portion 104 of element 101 which lies between the disks. The second sensor is formed of the offset section 106. If the transducer 99 is a Joule-Weidemann transducer then the torsional wave will be reflected more strongly at the disks 102 and 103 then the extensional waves, since the polar moment of inertia, J, is a function of the diameter to the fourth power while the area is, of course, only dependent upon the diameter squared. Since the disks 102 and 103 represent an increase in acoustical impedance, there will be no phase reversal in the reflections from these two discontinuities and the torsional sensor pulses are therefore the same polarity as the originally generated pulse, that is negative. Reverberation pulses may arise within the first sensor 104 since the reflected pulse from disk 103 is again partially reflected at disk 102 thereby forming a reverberation pulse, and each following reflection creates further reverberation pulses. However, these reverberation pulses are all reflected from discontinuities which represent an increase in impedance and hence do not undergo any phase reversal. Accordingly, all of the reflection pulses from the torsional sensor 104 are negative in polarity.

The extensional mode waves are only slightly affected by the discontinuities 102 and 103 both because of its lesser dependent diameter of this mode and also, where the exciting pulse is an appropriate length, because the relatively thin disks 102 and 103 do not represent as substantial a change in impedance to the longer extensional pulses as they do for the shorter torsional wave pulses. The 45° offset appears to an extensional pulse traveling down the intermediate rod 101 as a smaller area and hence as a decrease in extensional wave impedance. This decrease in impedance generates a reflection which undergoes a phase reversal and hence produces a positive reflection pulse. The extensional wave reflection at the end of the element 106 is again a phase reversing one and hence both of the extensional sensor 106 reflection pulses are positive in polarity. The first reflection pulse originating at the end of sensor 106 sees an acoustic discontinuity as it returns toward the torsional sensor 104 due to the 45° offset. This discontinuity again appears as a decrease in impedance thereby generating a reverberation pulse of opposite polarity, that is, negative which upon reflection from the end of sensor 106 is again phase reversed to become a positive reverberation pulse. Thus all of the primary reflection and reverberation pulses from sensor 106 are positive. The circuit coupled to transducer 99 in this embodiment therefore can distinguish torsional pulses and extensional pulses on the basis of polarity and, since the torsional pulses are indicative of transmission characteristics in sensor 104, and the extensional pulses are indicative of transmission characteristics in sensor 106, this polarity distinction serves as a basis for separating the measurement of ambient conditions at sensor 106 from those at sensor 104. While the 45° offset is shown as creating the decreased impedance from both directions, this could also be accomplished by a notch in the cylindrical rod.

While the embodiments described above have included unitary transducers for both generating ultrasonic pulses and receiving the ultrasonic pulses, separate transducers may be employed for each purpose. Similarly, the transducers have been shown mounted at one end of the assembly, however, it should be understood that the transducer could be mounted in the center of the assembly with the sensors at either side. Also, four sensors might be employed with two on either side and with spacing arranged such that the pulses from one side would be delayed sufficiently in time with respect to the pulses of the other to provide a basis for separation. In those embodiments where the sensors are sequentially positioned, both a 45° angular offset and an axially in line configuration have been shown. The offset angle can however, be made smaller or much larger, provided that the radius of curvatures is kept of comparable dimension to the wave length of the pulse.

The invention having been described modifications and improvements will now become apparent to those skilled in the art and the invention should be construed as limited only by the spirit and scope of the appended claims.

What is claimed is:

1. A system for measuring the ultrasonic transmission characteristics of a pair of sensors comprising, an ultrasonic transducer for producing output pulses of ultrasonic energy in both the extensional and torsional modes, and for producing output electrical signals in response to received ultrasonic pulses in both modes, a lead-in member coupled to said ultrasonic transducer, a first sensor element formed of a material having an ultrasonic transmission characteristic which varies in response to variations in at least one ambient condition;

a second sensor element formed of a material having an ultrasonic transmission characteristic which varies in response to changes in at least one ambient condition, said lead-in element being acoustically coupled to said first and second sensors, the materials and dimensions of each of said sensors relative to one another and to said lead-in element being controlled to produce substantial reflected pulses of ultrasonic energy at each end of said sensors, the reflection pulses at the ends of one of said sensors being primarily in the torsional mode and the reflection pulses at the other of said sensors being primarily in the extensional mode, and means coupled electrically to said transducer for measuring said torsional mode reflection pulses in order to determine the ultrasonic transmission characteristics of one of said sensors and means for measuring the extensional reflection pulses in order to determine the ultrasonic transmission characteristics of the other of said sensors.

2. A system in accordance with claim 1 wherein said lead-in member is coupled directly to one end of said first sensor and said second sensor is coupled to the other end of said first sensor.

3. A system in accordance with claim 2 wherein said lead-in element, said first sensor and said second sensor are in axial alignment.

4. A system in accordance with claim 2 wherein the ratio of torsional wave impedances between said lead-in element and said first sensor is made relatively high compared to the ratio of extensional wave impedances between said lead-in element and said first sensor and wherein the ratio of torsional wave impedances between said first sensor and said second sensor is made less than the extensional wave impedance ratio between said first sensor and said second sensor, whereby said first sensor becomes primarily a torsional wave sensor and said second sensor becomes primarily an extensional wave sensor.

5. A system in accordance with claim 4 wherein said relative impedances between said first and second sensors result from a change in the composition of the materials forming said first and second sensors.

6. A system in accordance with claim 4 wherein the relative impedances between said first and second sensors are controlled by changing the shape of said first and second sensors.

7. A system in accordance with claim 2 wherein the ratio of extensional wave impedances between said lead-in element and said first sensor is made relatively high compared to the ratio of torsional wave impedances between said lead-in elements and said first sensor and wherein the ratio of torsional wave impedances between said first and said seconds sensors is made relatively high compared to the ratio of torsional wave impedances between said lead-in element and said first sensor.

8. A system in accordance with claim 1 wherein said first sensor is coupled directly to said lead-in element and said second sensor is radially displaced from said first sensor and coupled directly to said lead-in element.

9. A system in accordance with claim 8 wherein said first sensor is made responsive to one ambient condition and has an ultrasonic transmission characteristic substantially independent of a second ambient condition and wherein said second sensor has an ultrasonic transmission characteristics response to at least said second ambient condition.

10. A system in accordance with claim 1 wherein said ultrasonic transducer comprises separate transducers, one of said transducers being responsive only to received acoustic energy in the torsional mode and the other being responsive only to received acoustic energy in the extensional mode.

11. A system in accordance with claim 1 wherein said ultrasonic transducer is sensitive to received ultrasonic energy in both the torsional and extensional modes and further including means coupled electrically to said transducer for separating signals representing said torsional mode pulses from signals representing said extensional mode pulses based upon their distribution in time.

12. A system in accordance with claim 1 wherein said ultrasonic transducer is formed such that extensional mode pulses are characterized by one frequency band and torsional mode pulses are characterized by a different frequency band and including means electrically coupled to said transducer for separating said extensional mode pulses from said torsional mode pulses based upon said frequency characteristics.

13. A system in accordance with claim 1 wherein said acoustical impedance of said transducer and said lead-in element are matched for both torsional and extensional mode waves.

14. A system in accordance with claim 1 wherein said lead-in member is coupled to one end of said first sensor and wherein said second sensor is coupled to the other end of said first sensor, said first sensor having acoustical discontinuities at each of its ends, primarily generating torsional mode reflection pulses, said discontinuities being such that only reflection pulses of one polarity are produced thereby, said second sensor having acoustical discontinuities at each of its ends which generate extensional mode reflection pulses, the relative acoustic impedances of said second sensor being such that the reflection pulses generated at its ends are only of a second polarity opposite to the polarity of the pulses generated at said first sensor, and wherein said ultrasonic transducer is sensitive to received ultrasonic energy in both the torsional and extensional modes and wherein said means coupled electrically to said transducer includes means for separating signals representing said torsional mode pulses from signals representing said extensional mode pulses based upon their polarity.

References Cited

UNITED STATES PATENTS

| 3,273,146 | 9/1966 | Hurwitz | 73—67.8 |
| 3,350,942 | 11/1967 | Peltola | 73—67.8 |

FOREIGN PATENTS

| 288,629 | 3/1965 | Netherlands. |

RICHARD C. QUEISSER, Primary Examiner

V. J. TOTH, Assistant Examiner

U.S. Cl. X.R.

73—67.1, 339